US006675274B1

(12) United States Patent
Lam et al.

(10) Patent No.: US 6,675,274 B1
(45) Date of Patent: Jan. 6, 2004

(54) METHOD AND APPARATUS FOR DETERMINING VOLUME SWAPS

(75) Inventors: Tao Kai Lam, Boston, MA (US); Yoav Raz, Newton, MA (US); Ruben I. Michel, Hopkinton, MA (US); Musik Schreiber, Brookline, MA (US); Avigail Matalon, Chestnut Hill, MA (US)

(73) Assignee: EMC Corporation, Hopkinton, MA (US)

( * ) Notice: Subject to any disclaimer, the term of this patent is extended or adjusted under 35 U.S.C. 154(b) by 371 days.

(21) Appl. No.: 09/809,001

(22) Filed: Mar. 15, 2001

(51) Int. Cl.[7] .............................................. G06F 12/02
(52) U.S. Cl. ............................. 711/170; 711/6; 711/202
(58) Field of Search ............................ 711/6, 202, 111, 711/112, 170, 171, 172, 173

(56) References Cited

U.S. PATENT DOCUMENTS

| 5,841,958 A | * 11/1998 | Buss et al. ................... 345/440 |
| 6,061,761 A | 5/2000 | Bachmat ...................... 711/114 |
| 6,067,259 A | * 5/2000 | Handa et al. ................ 365/200 |

OTHER PUBLICATIONS

Pending U.S. patent application, Ser. #09/396,218, filed Sep. 15, 1999 "Method for Transparent Exchange of Logical Volumes on a Disk Array Storage Device", Schrieber, et al.
Pending U.S. patent application, Ser. #09/396,253 filed Sep. 15, 1999, "Load Balancing on Disk Array Storage Device," Bachmat et al.
Pending U.S. patent application Ser. #09/709,077 filed Nov. 20, 2000, "Correlation Criteria for Logical Volumes," Michael et al.
Data Structures and Algorithms, Alfred V. Aho, John E. Hopcroft, Jeffrey D. Ullman, Addison–Wesley Publishing, pp. 246–250, 1983.
Combinatorial Optimization: Algorithms and Complexity, Christos H. Papadimitriou, Kenneth Steiglitz, Dover Publications, Inc. pps 193–247; 22–23.
Introduction To Algorithms, by Thomas H. Cormen, Charles E. Leiserson, Ronald L. Rivest, Mar. 1, 1990, McGraw Hill, pp. 579–629.

* cited by examiner

*Primary Examiner*—Hiep T. Nguyen
(74) *Attorney, Agent, or Firm*—Choate, Hall & Stewart

(57) ABSTRACT

Described are techniques for determining temporary storage areas for logical volumes to be swapped. Logical volumes may be swapped in a computer system in connection with efforts to improve performance of associated data storage entities in the computer system. As part of the data swapping and physical relocation of logical volumes, temporary storage locations are used. A temporary storage location is associated and used with each logical volume being swapped. Determining a temporary storage area for a logical volume may be made in accordance with particular criteria. A temporary storage area is determined for each logical volume from a list of one or more possible candidate locations. The problem of matching a logical volume to a unique temporary storage area may be represented as a bipartite graph matching problem using solutions, such as the maximum flow, and other techniques to find a match for each logical volume.

28 Claims, 22 Drawing Sheets

| LV to be swapped | DRV candidate list | | |
|---|---|---|---|
| LV 101 | LVa | LVc | LVd | LVe |
| LV 102 | LVb | LVd | | |
| LV 103 | LVa | LVb | | |

FIGURE 4

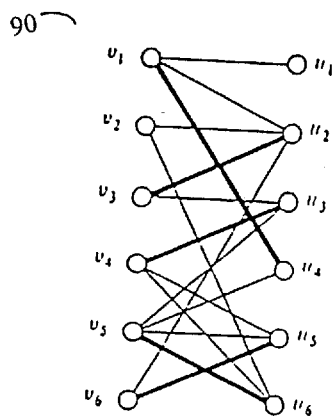
FIGURE 7A
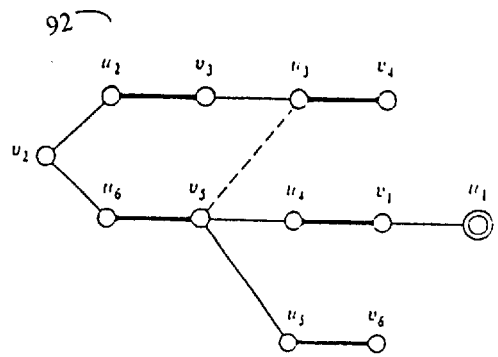
FIGURE 7B
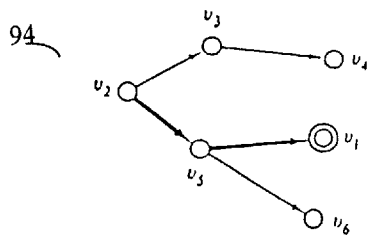
FIGURE 7C
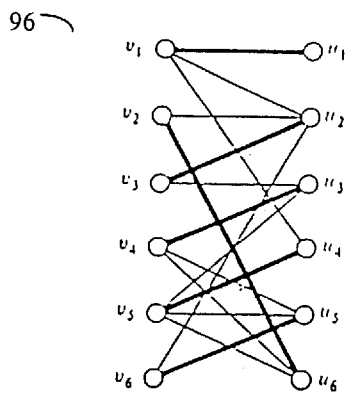
FIGURE 7D
FIGURES 7A-7D

100 ⎯⎯⎯⎯

BIPARTITE MATCHING ALGORITHM
Input: A bipartite graph $B=(V,U,E)$.
Output: The maximum matching of $B$, represented by the array *mate*.
begin
    for all $v \in V \cup U$ do mate[v]:=0; (comment: initialize)
stage: begin
    for all $v \in V$ do exposed[v]:=0;
    $A:=\emptyset$; (comment: begin construction of the auxiliary graph $(V,A)$)
    for all $(v,u) \in E$ do
    if mate[u]=0 then exposed[v]:=u else
      if mate[u]≠v then $A:=A \cup (v, mate[u])$;

```
Q:=∅;
for all v ∈ V do if mate[v]=0 then Q:=Q∪{v}, label[v]:=0;
``` while $Q \neq \emptyset$ do
      begin
      let v be a node in Q;
      remove v from Q;

102 ⎯⎯⎯
```
if exposed[v]≠0 then augment(v), go to stage;
else
    for all unlabeled v' such that (v,v') ∈ A do
        label[v']:=v, Q:=Q∪{v'};
``` end
    end
end procedure augment(v)
    if label[v]=0 then mate[v]:=exposed[v],
                  mate[exposed[v]]:=v;
    else begin
        exposed[label[v]]:=mate[v];
        mate[v]:=exposed[v];
        mate[exposed[v]]:=v;
        augment(label[v])
      end

FIGURE 8

114 — MAX-FLOW ALGORITHM
Input: A network $N=(s,t,V,A,b)$.
Output: The maximum flow $f$ of $N$.
begin
    f:=0, done:="no"; (comment: initialize) — 116a
    while done = "no" do
    begin (comment: a new stage)
        g:=0;
        construct the auxiliary network $AN(f)=(s,t,U,B,ac)$; — 118a
        if t is not reachable from s in AN(f) then done:="yes" — 119
        else repeat
           begin
              ⎡while there is a node v with throughput[v]=0 do⎤ — 118b
              ⎢  If v=s or t then go to incr                  ⎥
              ⎣  else delete v and all incident arcs from AN(f)⎦
        118c — ⎧let v be the node in AN(f) for which
                 ⎩throughput[v] is the smallest (comment: nonzero);
            push(v, throughput [v]); — 118d
            pull(v, throughput [v])
            end     — 118e
    incr: f:=f+g — 118f
    end
end procedure push(y,h)
(comment: it increases the flow g by h units pushed from y to t in a "systematic" way)
(comment: the procedure *pull* is completely analogous)
begin
    ┌─────────────────────────────────────────────┐
    │ Q:={y}
    │ for all u ∈ U−{y} do req[u] :=0;
    │ req[y] :=h
    │ (comment: req[u] denotes how many units of
    │          flow must be pushed out of u)
    └─────────────────────────────────────────────┘ while Q ≠ ∅ do
    begin
        let v be an element of Q;
        remove v from Q;
        (comment: Q *must* be a queue)
        for all v' such that (v,v') ∈ B and until req[v]=0 do ┌─────────────────────────────────────────────┐
    │ begin
    │ m:=min (ac[v,v'], req [v]);
    │ ac [v,v'] :=ac[v,v']−m;
    │ if ac[v,v']=0 then remove (v,v') from B;
    │ req [v] :=req [v]−m;
    │ req [v'] :=req [v']+m;
    │ add v' to Q;
    │ g[v,v']:=g[v,v']+m
    │ end
    └─────────────────────────────────────────────┘ end
end

FIGURE 12

METHOD AND APPARATUS FOR DETERMINING VOLUME SWAPS

BACKGROUND

1. Technical Field

This application generally relates to computer systems, and more particularly to computer system performance.

2. Description of Related Art

Computer systems may include different resources that may be used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations, such as data read and write operations and also administrative tasks, such as data backup and mirroring operations. In connection with the I/O operations, a data storage system may include a data storage optimizer used in connection with improving device performance. The data storage optimizer may perform a variety of tasks, for example, determining what logical volumes (LVs) may be candidates for swapping to increase performance of the data storage system in accordance with one or more predetermined criteria. A "swap plan", as may be produced by a data storage optimizer, may identify LVs having data included therein to be swapped, and propose a rearrangement of these LVs. It should be noted that the LVs and their data may be swapped in accordance with the swap plan.

Generally, LV candidates may be identified using different techniques, which when rearranged according to the "swap plan", are expected to contribute to the reduction of any imbalance of load requirements for a plurality of physical disk storage devices. These different techniques may determine pairs of LV candidates in accordance with a variety of statistics and device-related characteristics, such as, for example, LV size, and device activity. Once these two logical volumes in a pair have been identified, the logical volumes and data are "swapped" into their new locations.

One technique used in performing the actual swapping process of the data for each LV and the physical location of each LV includes using a temporary storage area for each LV. Another technique includes using a temporary storage area only for each LV which does not have sufficient redundancy in the data storage system. In one embodiment, this redundancy may be achieved by an LV having three or more copies of its data maintained in the data storage system. One problem is determining a temporary storage area for each LV since each temporary storage area used may have to meet certain predetermined criteria, for example, such as size, that may vary with each LV. Determining whether there are enough temporary storage areas, and determining a temporary storage area for each LV may be used with great frequency, for example, in an optimizer of a data storage system. Thus, it may be desirous to have the technique to be efficient, and extensible for use with increasing numbers of LVs without having performance degradation penalties.

Thus, it may be desirous and advantageous to have an efficient and improved technique for determining whether there is a sufficient number of storage areas for the LVs that need them and for determining a matching temporary storage area for each LV.

SUMMARY OF THE INVENTION

In accordance with one aspect of the invention is a method executed in a computer system for determining there are sufficient alternate storage locations and matching at least one logical volume with a unique alternate storage location. The at least one logical volume and at least one alternate storage location are each represented as vertices in a graph. It is determined which of said at least one alternate storage location are candidates for each of said at least one logical volume and a relationship between said each logical volume and each of said at least one alternate storage location is represented as an edge in said graph. Using a bipartite graph matching technique for each of said at least one logical volume, a unique one of said at least one alternate storage location is determined.

In accordance with another aspect of the invention is a computer program product for matching at least one logical volume with a unique alternate storage location. The computer program product includes machine executable code for representing each of said at least one logical volume and each of at least one alternate storage location as vertices in a graph; machine executable code for determining which of said at least one alternate storage location are candidates for each of said at least one logical volume and representing a relationship between said each logical volume and each of said at least one alternate storage location as an edge in said graph; and machine executable code for determining, using a bipartite graph matching technique for each of said at least one logical volume, a unique one of said at least one alternate storage location.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is an example of a table representing the candidates for each logical volume to be swapped in an example;

FIGS. 7A–7D illustrate various graphical representations of one technique in forming a maximal matching graph using a first bipartite graph matching technique;

FIG. 8 is an example of a pseudo-code like representation of one embodiment of the (technique described in connection with FIGS. 7A–7D for forming augmenting paths from each exposed vertex;

FIG. 12 is an example of a pseudo-code representation of determining the max-flow of a graph.

Figure 1:
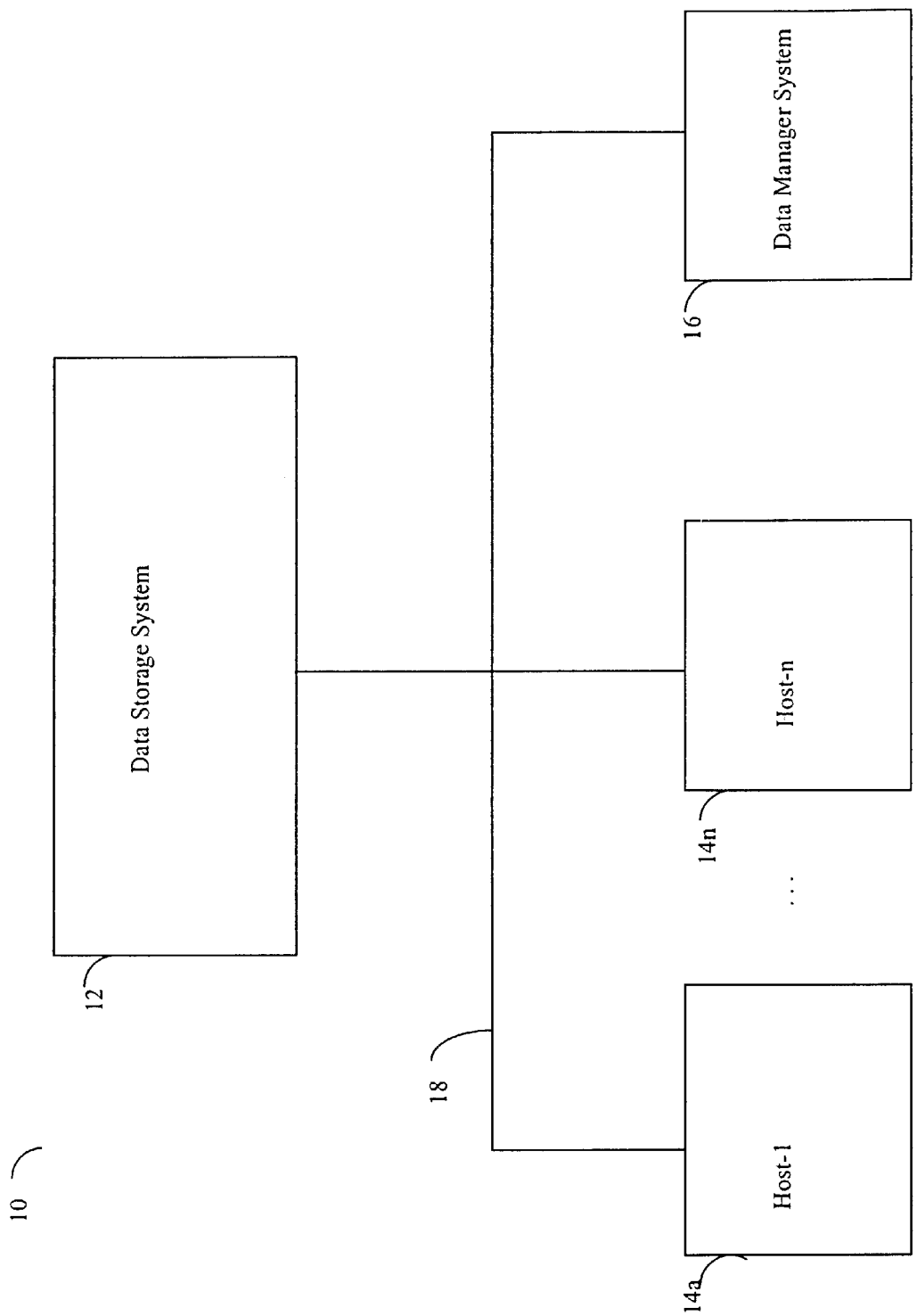
FIG. 1 is an example of an embodiment of a computer system according to the present invention.

DETAILED DESCRIPTION OF EMBODIMENT(S):

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue an I/O request to the data storage system 12 to perform a data operation. For example, an application executing on one of the host computers 14a–14n may perform a backup, mirroring or other administrative operation and may do so while performing I/O requests to the data storage system 12.

Figure 2:
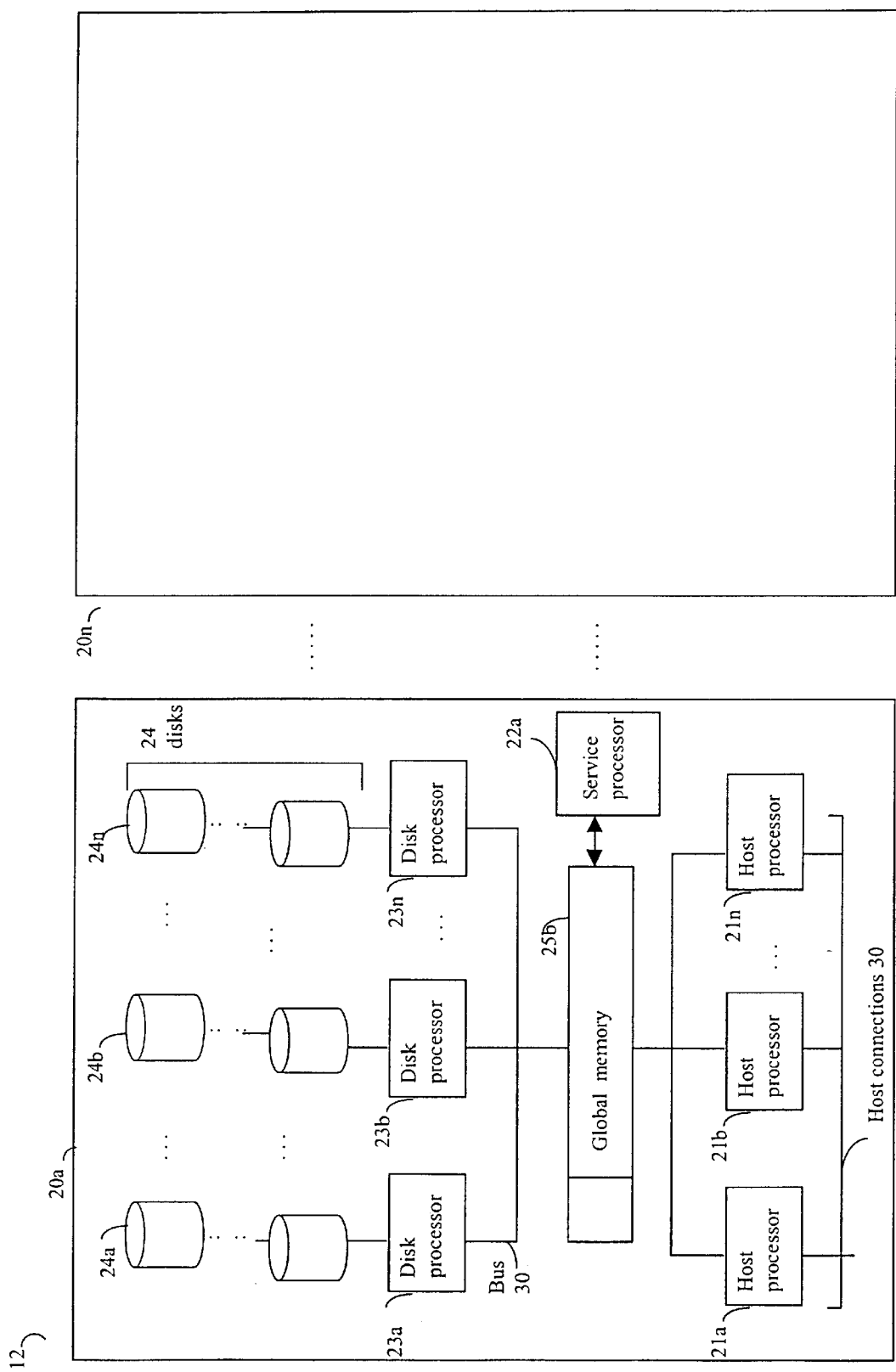
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Mass. In this particular example, each of the Symmetrix™ storage systems 20a–20n may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a–20n may be resources included in an embodiment of the computer system 10 to provide storage services to, for example, host computer systems and/or the data manager system.

Each of the Symmetrix™ systems, such as 20a, may include a plurality of disks, such as the arrangement 24 consisting of n rows of disks 24a–24n. In this arrangement, each row of disks may be connected to a disk processor or director responsible for the backend management of operations to and from a portion of the disks 24. In the Symmetrix™ system 20a, a single disk processor, such as 23a, is responsible for the management of a row of disks, such as row 24a. Each of the disk processors or directors 23a–23n are connected, for example, by a bus 30 to a cache that includes a particular portion designated as global memory 25b. The disk processors 23a–23n may perform data operations to and from the global memory 25b, for example, in communications with other disk processors or directors, and other components of the system 20a. Generally, the global memory 25b may be used in facilitating communications between components in the system 20a.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements of an I/O request as may be made from the different host computer systems 14a–14n. This performance data may be gathered and stored, for example, in the global memory and/or other storage area. In one embodiment, the performance data may be used in determining which LV candidates are to be swapped.

The system 20a may also include one or more host processors or directors 21a–21n. Each of these host processors or directors may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

The particular LVs selected for swapping may be determined in accordance with particular criteria, for example, related to the performance of each candidate as well as the hardware characteristics. For example, a first candidate LV having a high activity level may be swapped with a second LV candidate having a low activity level. By swapping these two logical volumes, a goal may be to increase overall performance, for example, of the Symmetrix data storage systems. Once these two logical volumes have been identified, the logical volumes and data are "swapped". In other words, the physical locations of each LV are "swapped", including the data associated with each LV. More generally, two or more logical volumes may be chosen and a rearrangement of these LVs may increase the overall performance.

Figure 3:
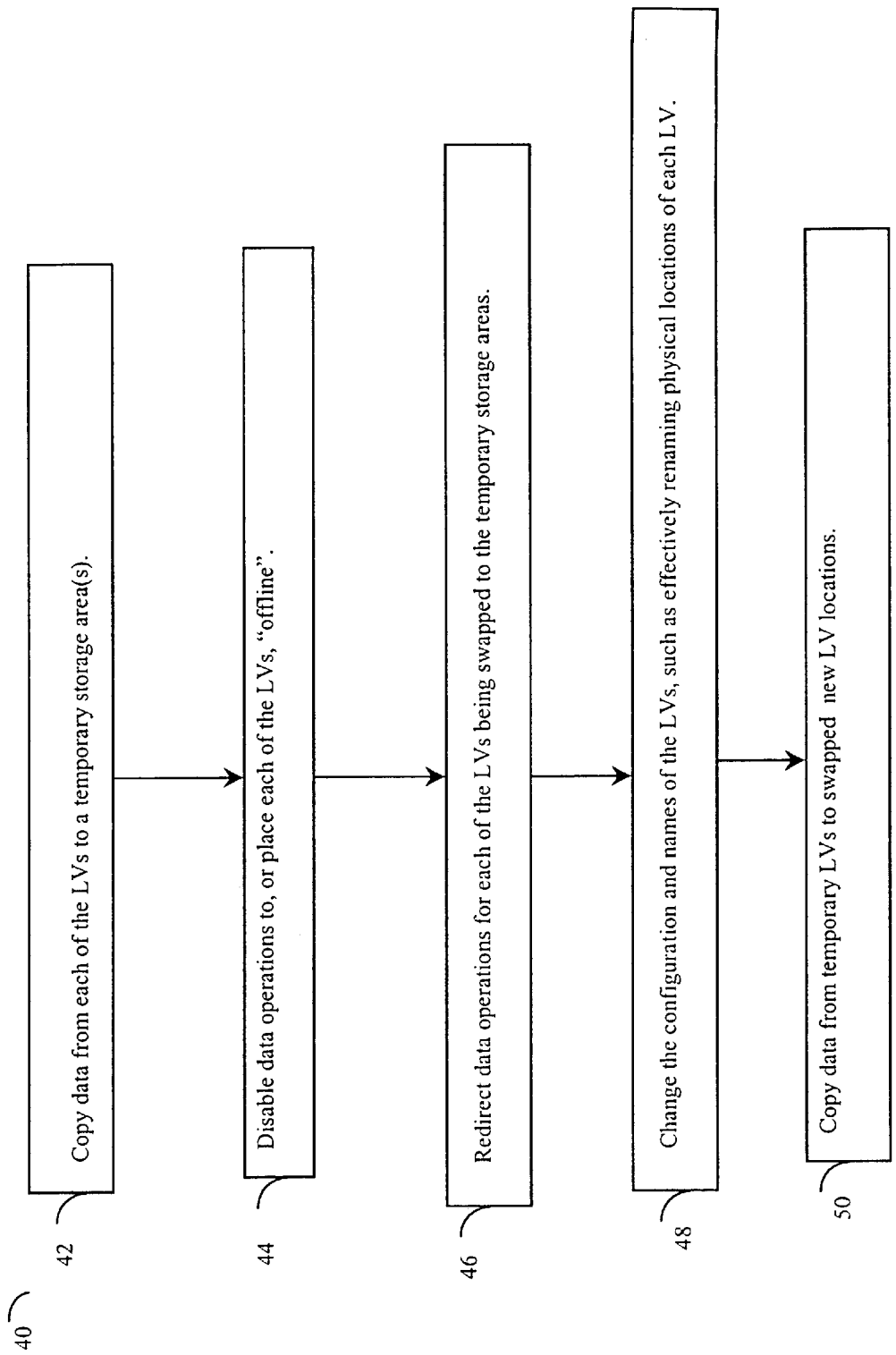
FIG. 3 is a flowchart of an example of steps of an embodiment for performing a swap of logical volumes.

Referring now to FIG. 3, shown is a flowchart 40 of an example of steps of one embodiment for swapping two LVs and their data. At step 42, data is copied from each of the pair of LVs to a temporary storage area(s). At step 44, each of the LVs are disabled or placed in an "offline" state such that, for example, with respect to data operations. At step 46, data operations for the two LVs in the pair are redirected to use the temporary storage area(s). At step 48, there is reconfiguration or renaming of the devices that includes each of the actual LVs effectively renaming the physical locations associated with each of the LVs on their devices. At step 50, the data associated with each of the LVs in the pair being swapped is copied to the other LV. Different copying techniques may copy data from the temporary storage areas and/or the actual LV location. One technique that may be used in an embodiment, for example, is described in pending U.S. application Ser. No. 09/396,218, filed Sep. 15, 1999, entitled "Method for Transparent Exchange of Logical Volumes in a Disk Array Storage Device", assigned to EMC Corporation, to Schrieber et al., which is herein incorporated by reference.

The foregoing may extend to swapping more than 2 LVs. Part of performing the processing of the steps of flowchart 40 of FIG. 3 includes determining a temporary storage area associated with each of the LV candidates to be swapped. One problem may be efficiently determining temporary storage areas for each of the LVs being swapped. Using one technique, there are restrictions or predetermined criteria for determining what temporary storage area may be used for an LV. Such restrictions or critera as maybe included in one embodiment are as described in pending U.S. application Ser. No. 09/396,218, filed Sep. 15, 1999, entitled "METHOD FOR TRANSPARENT EXCHANGE OF LOGICAL VOLUMES IN A DISK ARRAY STORAGE DEVICE", Schreiber et al., assigned to EMC Corporation of Hopkinton, Mass., and is herein incorporated by reference. These restrictions as to what temporary storage area may be used with a particular LV may vary with, for example, size compatibility of the LV and the temporary storage area, software versions on each device, and the like. In one embodiment, the temporary storage areas may be referred to as "dynamic reallocation volumes" or DRVs.

Referring now to FIG. 4, shown is an example of a table 70 with a list of temporary storage areas or a list of DRV candidates that may be used for each LV. It should be noted that the list of DRV candidates may be determined in accordance with restrictions and criteria, for example, as described in U.S. application Ser. No. 09/396,218. Using one technique for determining an DRV for a particular LV, the first DRV on a list which is currently not used or already associated with an LV may be selected. Using this technique, for LV101, DRV LVa may be selected. For LV102, DRV LVb may be selected. Finally, when determining a DRV for LV103, there is no DRV candidate currently unused. Thus, a reconfiguration of LVs and associated DRVs may be performed such that LV103 has an associated DRV.

Using one reconfiguration technique, for example, the previous matching of LVs and DRVs may be discarded and the process of selecting a particular DRV with an LV may be made in accordance with other criteria, such as selecting the second unused LV on the list, if there is more than one candidate. However, use of the foregoing technique may rapidly deteriorate as the number of LVs to be swapped increases.

The foregoing technique is of exponential complexity. For example, in one instance using the foregoing technique of determining DRVs in accordance with the DRV selection criteria as described in U.S. application Ser. No. 09/396,218, measurements on a Pentium III personal computer with 261 MB RAM show the following times for determining DRVs for the associated number of LVs. It should be noted that these may represent worst case scenarios.

| Number of LVs | Times |
| --- | --- |
| 4 | .03 seconds |
| 5 | .12 seconds |
| 6 | 7 seconds |
| 7 | 20 minutes |

The foregoing technique of determining a DRV for one or more LVs may be used with great frequency, for example, in an optimizer used in connection with a data storage system. Thus, it may be desirous to have the technique to be efficient, and more readily extendable for use with increasing numbers of LVs without having performance degradation penalties in the average and/or worst case situations.

One technique that improves over the foregoing recognizes the matching problem of matching a particular LV with a particular DRV or temporary storage area as a bipartite graph matching problem. Thus, techniques used for solving the bipartite graph matching problem may be used to determine temporary storage areas for each LV being swapped. Bipartite graphs, related properties and the like are described in data structure text books, for example, such as "Data Structures and Algorithms", by Aho, Hopcroft, and Ullman, by Addison-Wesley Publishing Company.

Generally, a bipartite graph G includes a set of edges E and two sets of vertices V and U. The set of vertices V and U are two disjoint sets of vertices in which each edge has one vertex in V and another in U. For solving one particular problem in an example, the set of vertices V may be the LVs, and set of vertices U may be the set of possible DRVs or temporary storage areas, and each edge included in the set of edges E may represent those DRVs that are candidates for each of the LVs, for example, as included in the previously described DRV candidate lists for each LV. An edge may be from a first vertex in V corresponding to an LV to a second vertex in U corresponding to a DRV candidate.

The matching problem is one that may be solved on graphs, and in particular, for bipartite graphs. One goal is to form a matching M of graph G in which M includes a set of edges E1 from G in which no two edges are incident upon a same vertex. Selecting a maximal subset of such edges is called a maximal matching problem. If (U,V) represent the disjoint sets of vertices, E1 includes an edge for each vertex in U which has a matching vertex in V. A vertex is matched if it is the endpoint of an edge. Each vertex in U must be matched to a unique vertex in V.

Using one set of terminology, a path connecting two unmatched vertices in which alternate edges of the path are in M is called an augmenting path relative to M. An augmenting path begins and ends with vertices not in M. M is a maximal matching if and only if there is no augmenting path relative to M. A vertex not in M is exposed and a vertex in M is matched. An edge in M is matched and an edge not in M is free.

Figure 5:
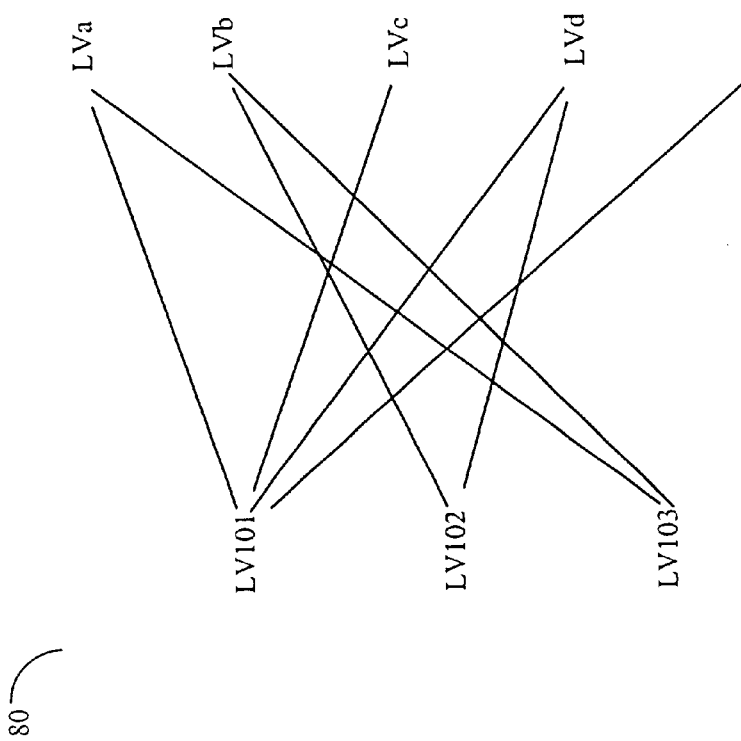
FIG. 5 is a graphical representation of the example from FIG. 4.

Referring now to FIG. 5, shown is an example of an embodiment illustrating a representation of the LV/DRV matching as a bipartite graph matching problem. The graph 80 is shown as a set of vertices having connecting edges. The graph G, with vertex sets V, U, and edge set E, is shown as 82 of FIG. 5 representing the example previously described in connection with FIG. 5 as a bipartite graph for which the bipartite graph matching problem may be solved to determine, for each LV, a matching single unique DRV.

Different techniques are known to those skilled in the art in connection with performing and solving a class of problems characterized as a bipartite graph matching problem.

Figure 6:
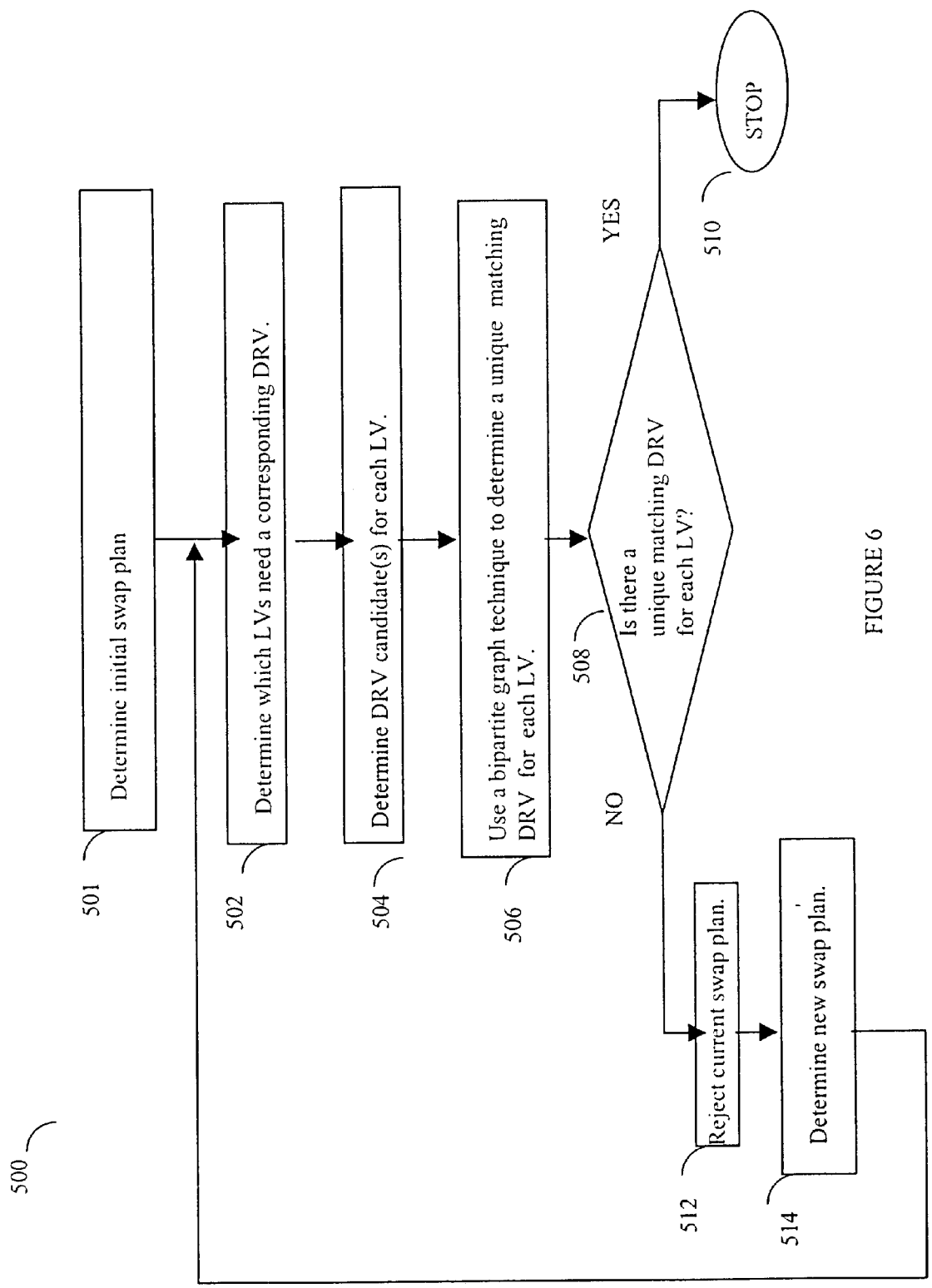
FIG. 6 is a flowchart of method steps of one embodiment for determining a matching temporary storage location for one or more logical volumes.

Referring now to FIG. 6, shown is a flowchart 500 of steps of one embodiment for determining a matching unique DRV or other temporary storage location for one or more LVs. The steps of flowchart 500 are generalized steps that may be included in an embodiment using a bipartite graph technique to determine a unique matching DRV for each LV.

At step 501, an initial swap plan is determined. At step 502, a determination is made as to which one or more LVs need a corresponding DRV. At step 504, one or more DRV candidates are determined for each LV. As described in more detail elsewhere herein, one or more DRV candidates for a particular LV may be determined in accordance with predetermined criteria. It should be noted that a swap plan may be determined using any one or more of a variety of different techniques, for example, as described in pending U.S. application Ser. No. 09/396,253, filed on Sep. 15, 1999 for "Load Balancing on a Disk Array Storage Device", Bachmat et al., assigned to EMC Corporation, as herein incorporated by reference, pending U.S. patent application Ser. No. 09/709,077, filed on Nov. 10, 2000, entitled "Correlation Criteria for Logical Volumes", by Michael et al. which is herein incorporated by reference, and U.S. Pat. No. 6,061,761, filed Oct. 6, 1997 to Bachmat which is herein incorporated by reference.

At step 506, a bipartite graph technique may be used to determine a unique matching DRV for each LV. Particular bipartite graph techniques, such as the maximum flow technique and the augmenting path technique, are described elsewhere herein in more detail. An embodiment may include one of these or other bipartite graph matching techniques. It should be noted that a bipartite graph matching technique may terminate, for example, when a maximum matching is reached.

At step 508, a determination is made if there is a unique matching DRV for each LV selected at step 502. If a determination is made that there is a unique matching DRV for each LV, control proceeds to step 510 where the steps of flowchart 500 terminate. If a determination is made at step 508 that a unique matching DRV has not been determined for each LV selected at step 502, control proceeds to step 512 where the current swap plan is rejected and a new swap plan is determined at step 514. It should be noted that a swap plan may be determined, for example, at step 501 and/or step 514, using any one of a variety techniques. Control then proceeds to step 502.

One such technique used in connection with the bipartite matching problem is described, for example, in the text book entitled "Combinatorial Optimizations: Algorithms and Complexities", Dover Publications, by Papdimitriou and Stieglitz, Chapters 9 and 10. In particular, section 10.2 describes a technique for finding a maximal matching M of graph G by repeatedly discovering an augmenting path P and augmenting the current matching to M⊕P where "⊕" denoted the exclusive OR operation of the sets. In other words, the new matching includes the edges that are in M or P, but not in both. Recall that M is a maximal matching if and only if there is no augmenting path relative to M. A maximal matching involves selecting a subset of edges such that no two edges are incident upon the same vertex.

The general case for finding an maximal matching M may be represented as:
1. Start with M=∅
2. Find an augmenting path P relative to M and replace M by M⊕P.
3. Repeat (2) until no further augmenting path exists at which point M is a maximal matching.

The foregoing may be made more specific to apply to bipartite graphs by growing alternating paths in search of augmenting paths only from exposed vertices in V, for example, in a breadth-first like manner. For example, in one embodiment, the search for alternating paths considers vertices adjacent to a particular vertex.

Referring now to FIG. 7A, shown is an example of a representation of a graph G having a matching graph M indicated by edges with the heavier lines. Since the representation 90 is of a bipartite graph, the only exposed vertex is v2 from the vertices in the set V. Thus, one technique may start growing alternate paths from v2. The representation 92 is an example of how an alternate, and hence augmenting, path is grown from the vertex v2. Included from v2 are all free edges that are adjacent to v2, namely those edges to vertices u2 and u6. Now, included are matched edges from u2 and u6. If either u2 or u6 were exposed, the alternating path would be an augmenting path and the search would stop. However, this is not the case and the nodes v3 and v5 are added to the alternating paths and alternating paths are continued from these vertices. In this example, redundancy between vertices is omitted, for example, such as the edge indicated between v5 and u3 since u3 is included in a first alternating path constructed from v3. The next level of vertices include v4, v1 and v6 as included in the representation 92. Finally, from vertex v1 constructed is the edge to u1 which is an exposed vertex. Thus there is constructed an augmenting path in the representation 92. If there were other exposed vertices in V, the foregoing technique may be used repetitively to build alternating paths.

It should be noted that the process of searching for augmenting path is similar to a breadth-first search with a particular structure in that the odd-numbered levels, if v2 is considered at level 0, include a next vertex that is a mate of the current vertex. For example, at level 1 are vertices u2 and u6. The next level, at level 2, includes vertices which are mates of these vertices. Thus, this technique may be simplified by ignoring the odd-level vertices and proceeding with a search as represented in 94 of FIG. 7C. The representation 96 in FIG. 7D corresponds to an augmented M that is M⊕P.

One embodiment of the foregoing technique may be represented in a pseudo-code like description of FIG. 8. Generally, the representation 100 uses two arrays mate and exposed in addition to the array label used for searching. Mate has a number of entries equal to the number of vertices in V and U and represented the current matching of the graph. For all vertices belonging to V, such as corresponding to the set of LVs in one example, exposed[v] is a node of U that is exposed and adjacent to v. Otherwise,
exposed[v]=0.

If a node v belonging to V is discovered such that exposed [v]<>0, an augmenting path has been found. The procedure included in this representation, augment, is recursive. The embodiment 100 of FIG. 8 terminates when there is no augmenting path in the current matching. In this case, the current matching is a maximal matching.

It should be noted that an embodiment may also include particular modifications from the foregoing description, for example, from the representation included in FIG. 8. An embodiment may compute the array exposed [v] on an as needed basis determined during execution rather than be computed at the beginning of "stage" indicated in FIG. 8. For example, in the pseudocode-like description of FIG. 8, exposed[v] may be computed at step 102. So, only certain portions of the array exposed, instead of the whole array, may be computed at each stage.

An embodiment may also include a modification to the description with reference to FIG. 8. Rather than construct an auxiliary graph (V,A) as in FIG. 8, an embodiment may produce and use a search tree, for example, as in FIG. 7B to keep track of all those edges and vertices traversed.

In terms of time bounds, the foregoing operates in O(min (|V|, |U|)*|E|) time in which the notation of |V|, |U|, and |E| refers to the size or number of elements in the set. Min refers to the minimum of the elements in the comma list.

Other techniques associated with solving this particular class of problems of the bipartite graph may be more efficient in terms of time performance. Another technique described in section 10.3 of the text entitled "Combinatorial Optimizations: Algorithms and Complexities", Dover Publications, by Papdimitriou and Stieglitz, reduces the bipartite graph matching problem to the max-flow problem for simple networks. The general technique is to push flow, not augment paths.

Figure 9:
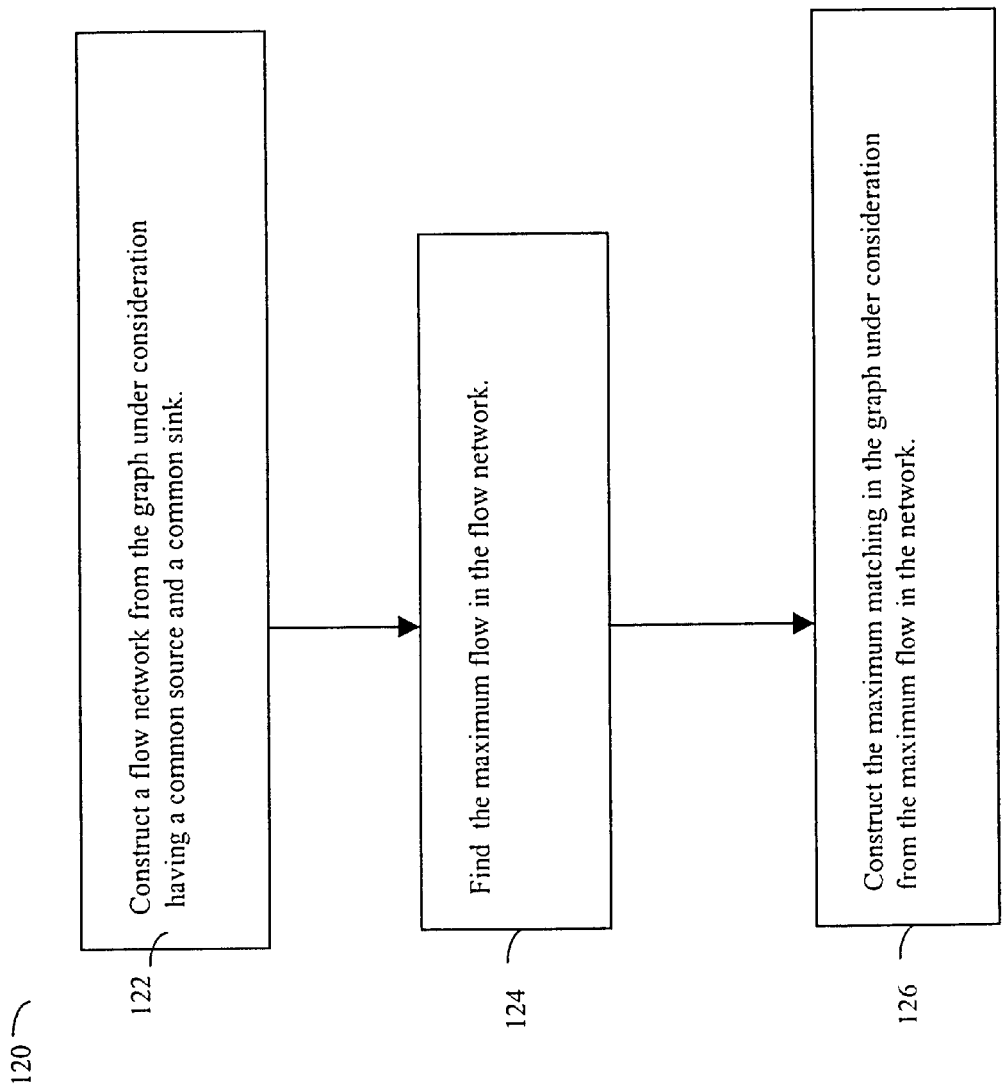
FIG. 9 is a flowchart of an example of one embodiment for performing a second technique for solving the bipartite matching problem.

Referring now to FIG. 9, shown is a flowchart 120 of steps of one embodiment in which the matching problem for bipartite graphs is reduced to the max-flow problem for simple networks. At step 122, a simple network is formed from the bipartite graph under consideration. This is explained in more detail elsewhere herein.

At step 124, the maximum flow in the simple network is determined. One technique for determining this is described in more detail elsewhere herein.

At step 126, the maximum matching in the graph under consideration is constructed from the maximum flow in the simple network. This step is also described in more detail elsewhere herein.

Figure 10:
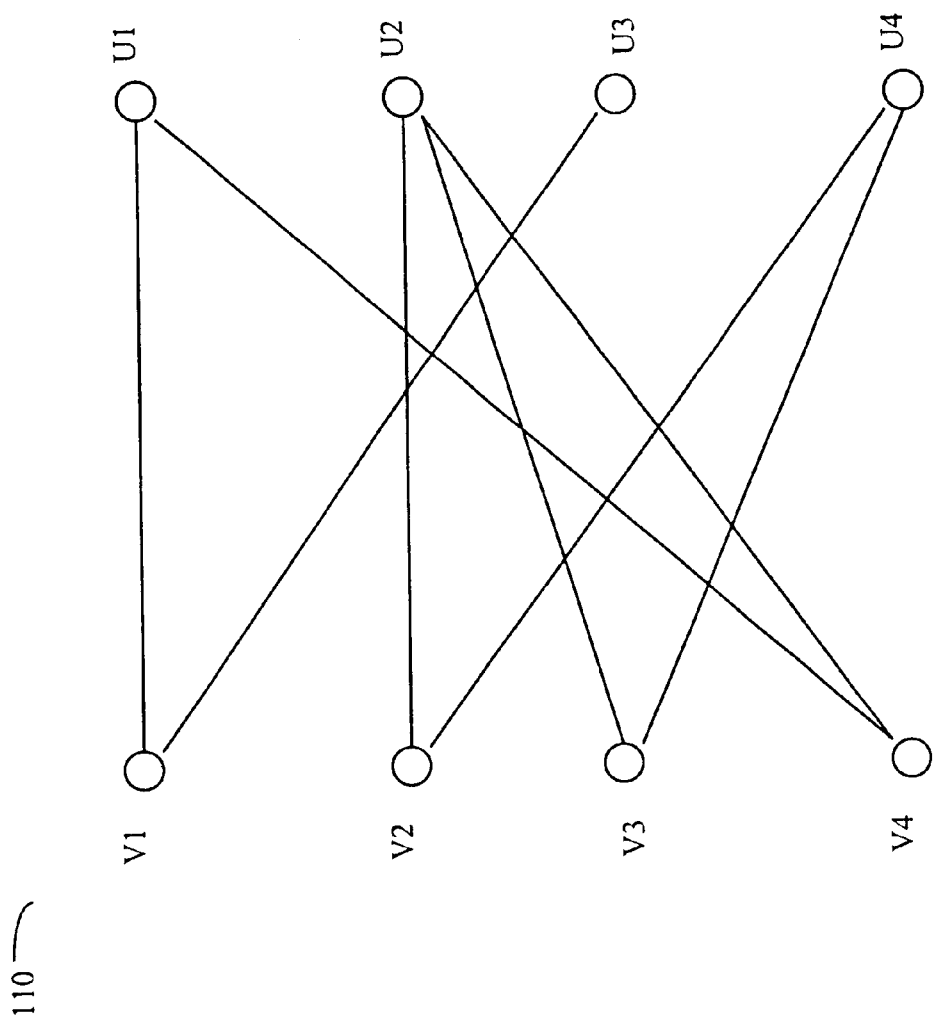
FIG. 10 is an example of a representation of a bipartite graph.

Referring now to FIG. 10, shown is a bipartite graph B 110. This graph 110, as part of this technique for the max-flow problem for simple networks in step 122, is used to construct a network N(B) represented as 112 in FIG. 11 having a single source s and a single sink t in which each arc has a capacity of 1. This representation of a bipartite graph as a network may be referred to as a simple network having properties particular to being constructed from a bipartite graph that reduce or simplify the problem.

A network may be defined as N=(s,t,V,A,b) where a digraph (V,A) together with a source s in V has indegree=0, and terminal t in V with outdegree=0. Each edge (u,v) belonging to A has a capacity or bound denoted b(u,v). With bipartite graphs represented as networks, such as N(B) of FIG. 12, each arc has a capacity of 1 defined in more detail below.

Figure 11:
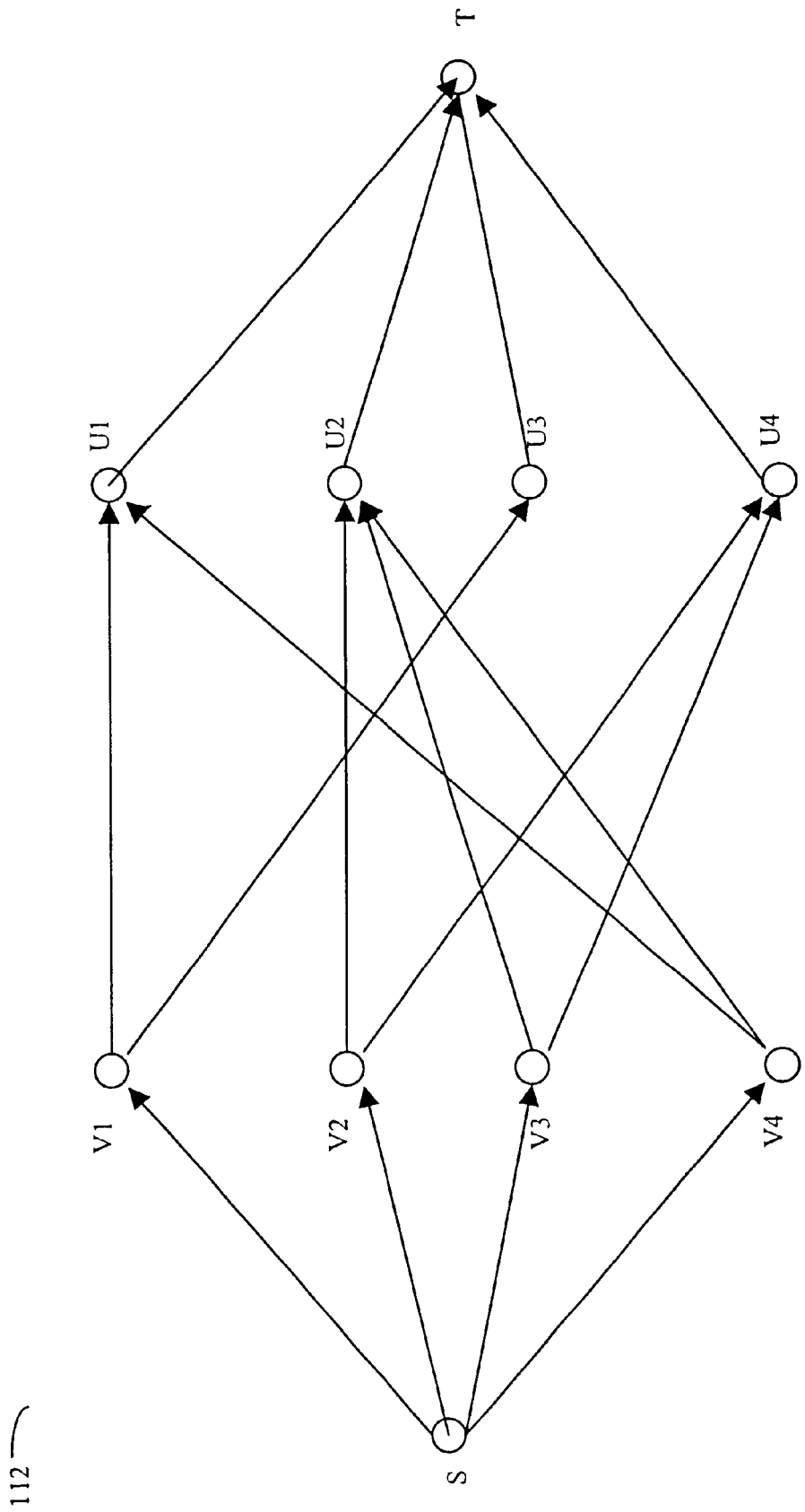
FIG. 11 is an example of a representation of a network of the bipartite graph of FIG. 10.

After constructing the network N(B), for example as in FIG. 11, the next step, as in FIG. 9 step 124, is to construct a maximum flow in N(B). What will now be described are some terms that are used in following paragraphs in connection with describing the maximum flow technique.

A flow f in N is a vector R having one component f(u,v) for each arc belonging to A such that:
1. $0 \leq f(u,v) \leq b(u,v) \forall (u,v)$ in A; and
2. $\Sigma f(u,v)$, for all (u,v) in $A=\Sigma f(v,u)$ for all (v,u) in A, where v is in V, but v<>s, and v<>t.

Given a network N=(s, t, V, A, b) and a feasible flow f of N, the network N(f)=(s, t, V, A(f), ac), wherein A(f) consists of the following arcs:
(a) If (u,v)∈A and f(u,v)<b(u,v), then (u,v)∈A(f) and ac(u,v)=b(u,v)−f(u,v).
(b) If (u,v)∈A and f(u,v)>0, then (v,u)∈A(f) and ac(v,u)= f(u,v), and ac(u,v) is called the augmenting capacity of (u,v)∈A(f).

Further, an auxiliary network AN(f) of a network N(f) may be determined using shortest paths in N(f). The vertices in N(f) are partitioned into disjoint layers each arc being assigned a level corresponding to the number of arcs in the shortest path from s to that vertex. Any shortest path from s to t will start with s (layer 0 node), visit a layer 1 node, layer 2 node, etc. Any arc that goes from a layer to a lower layer is discarded. So is any arc that goes between two nodes or vertices of the same layer. The resulting subnetwork of N(f) may be referred to as the auxiliary network AN(f).

Throughput of a node or vertex is the amount of flow that can be pushed through that node. In other words, the throughput of a node may be represented as:

minimum of (sum of capacities of incoming arcs, sum of capacities of outgoing arcs).

Referring now to FIG. 12, shown is an example of a pseudo-code like representation of one technique for constructing the maximum flow. Generally, the representation 114 operates in stages, for example as in the main loop of 114. At each stage, a network N(f) is constructed where f is the current flow, and from it, an auxiliary network AN(f) is constructed. The maximal flow g is found in AN(f) and g is added to f. Adding g(u,v) to f(u,v) for all forward arcs (u,v) in AN(f), and subtracting g(u,v) from f(u,v) for all backward arcs in AN(f). The main loop, and hence the technique, terminates when s and t, source and sink respectively, are disconnected in N(f), a sign that f is optimal.

As will be described in connection with an example of applying the maximum flow technique using the network N(B) of FIG. 11, a network N(f) may be constructed in an embodiment from a network N and flow f by reversing the arcs. Applying the above description, and auxiliary network AN(f) may be constructed by deleting vertices and arcs from N(f) to get AN(f).

Figure 13:
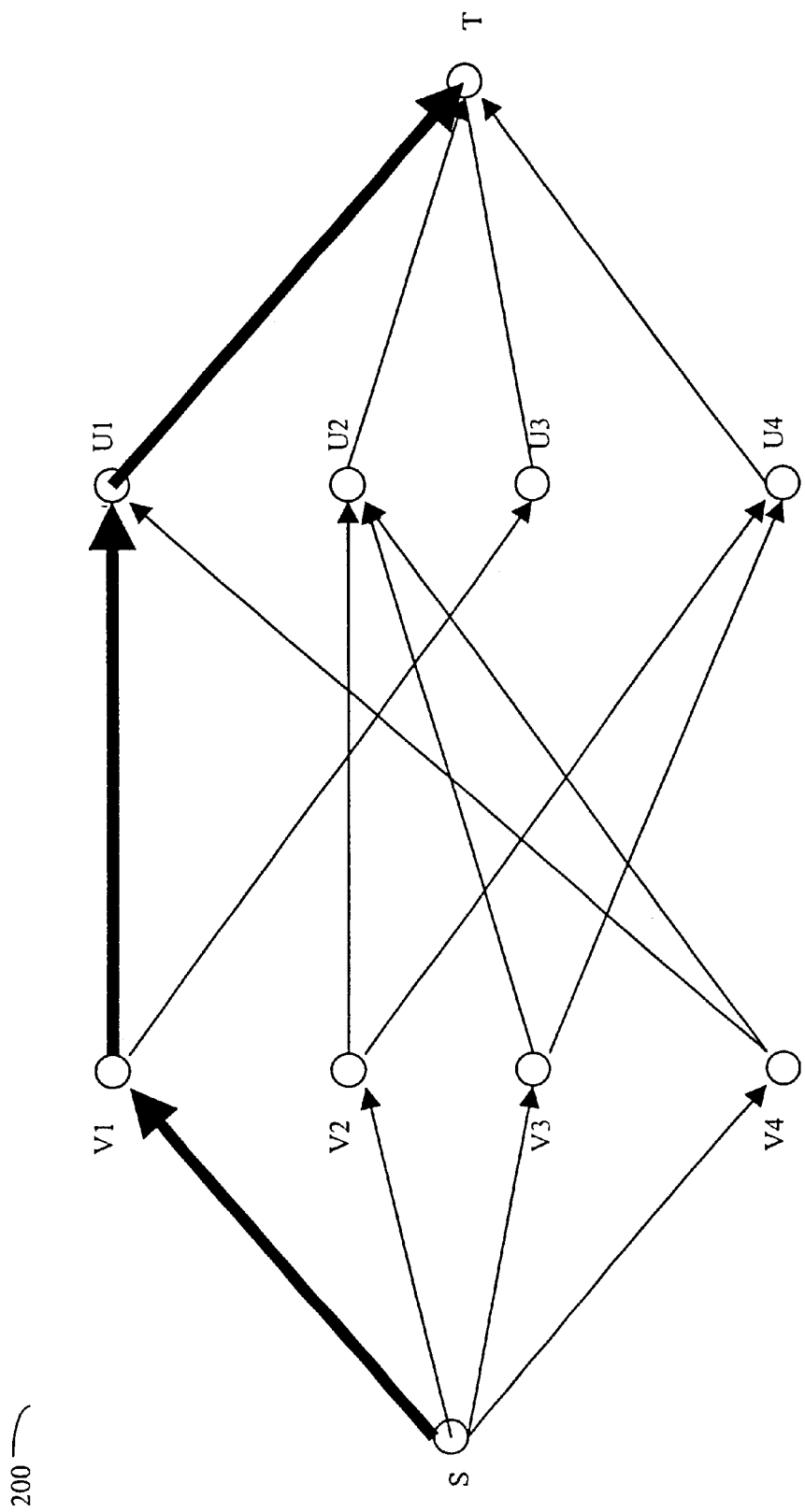
FIGS. 13–23 are example representations of various graphs, networks, and the like in performing the technique of FIG. 12 for the network of FIG. 11.

Applying the technique outlined in FIG. 12 using N(B), at stage 1, there is no flow initially as at step 116a, N(f) is N(B), and AN(f)=N(f) as constructed at step 118a. The while loop at step 118b is not entered in the first stage since there are no such vertices with throughput=0. Part of the processing performed in connection with statements 118d and 118e for pushing and pulling through v1 is shown by the thick or bolded lines of FIG. 13. The thick lines each have a capacity of 1 and all others 0. At the end of performing steps 118d and 118e for pushing and pulling, the thick or bolded lines noted in FIG. 13 are removed from AN(f).

It should be noted that in this instance of using a bipartite graph, the selection process at step 118c may be omitted as the throughput is always 1. In one embodiment, a first adjacent vertex may be used which, in this instance, is v1.

Figure 14:
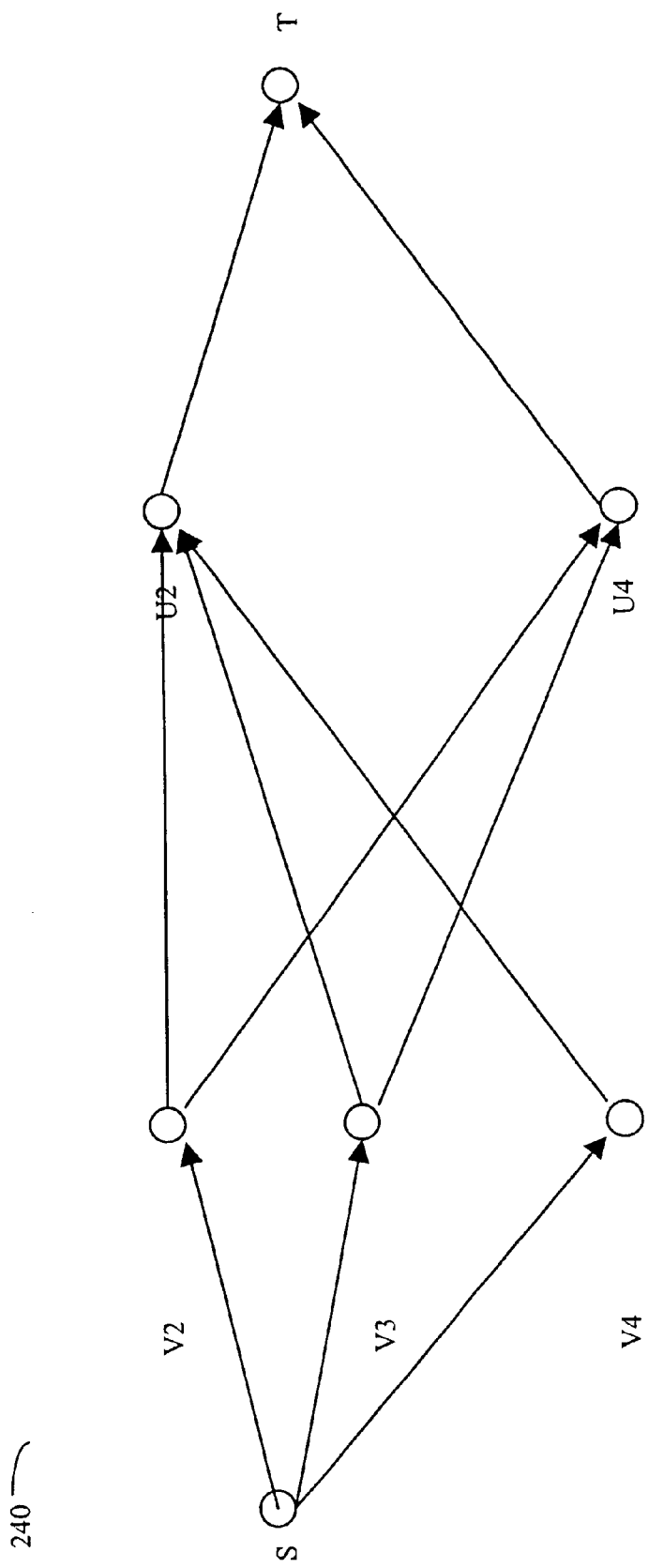
Figure 15:
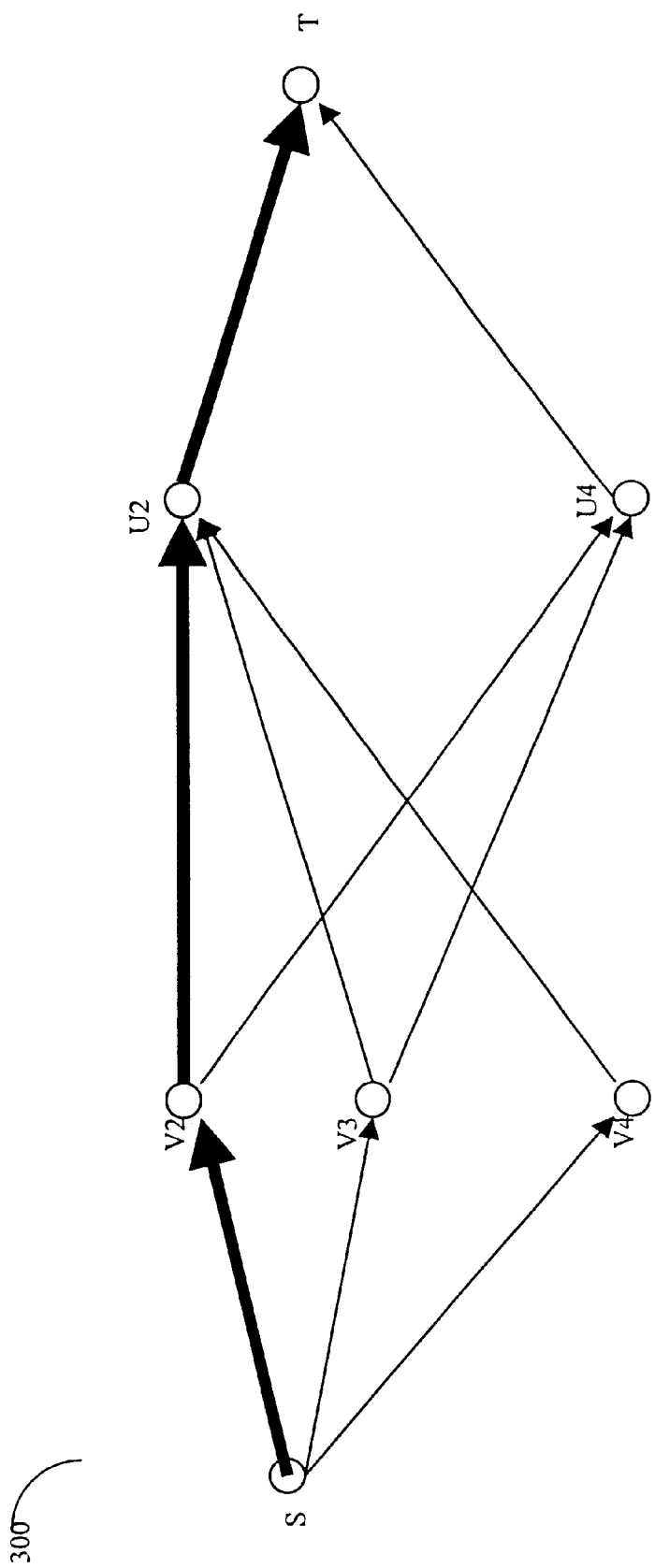
Figure 16:
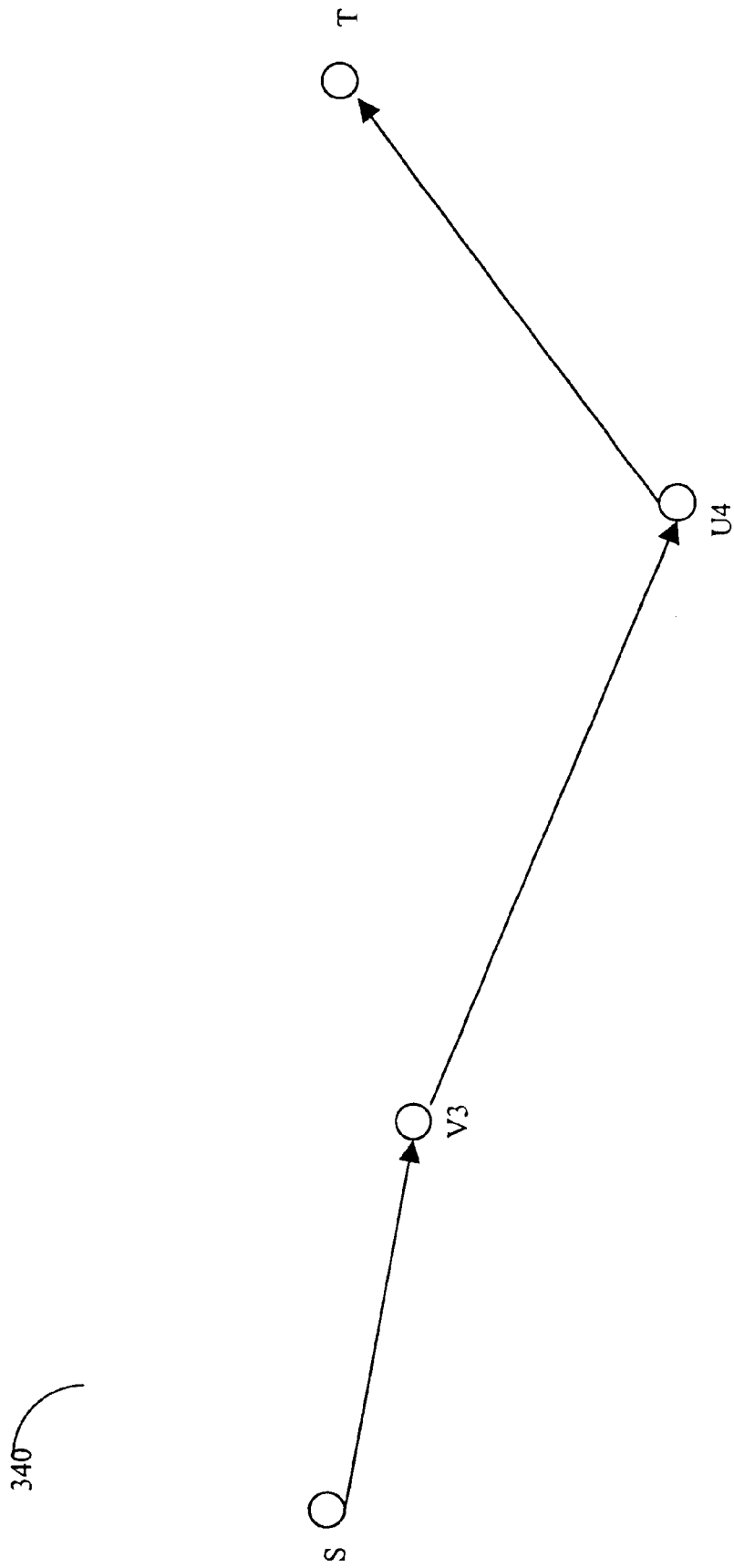

A next iteration of the repeat statement is performed as the else portion of 118b since there is a node with throughput=0 causing vertices with throughput=0 and all incident arcs to be deleted from AN(f) resulting in the graph AN(f) of FIG. 14. Execution of the push and pull is performed through v2 as indicated by the bolded lines of FIG. 15. Subsequently, the bolded lines and vertices with throughput of 0 are removed resulting in the network AN(f) of FIG. 16. A next iteration results in the arrows of FIG. 16 being bolded as there is a push and pull through v3 followed by deleting all arcs and vertices except s and t.

Figure 17:
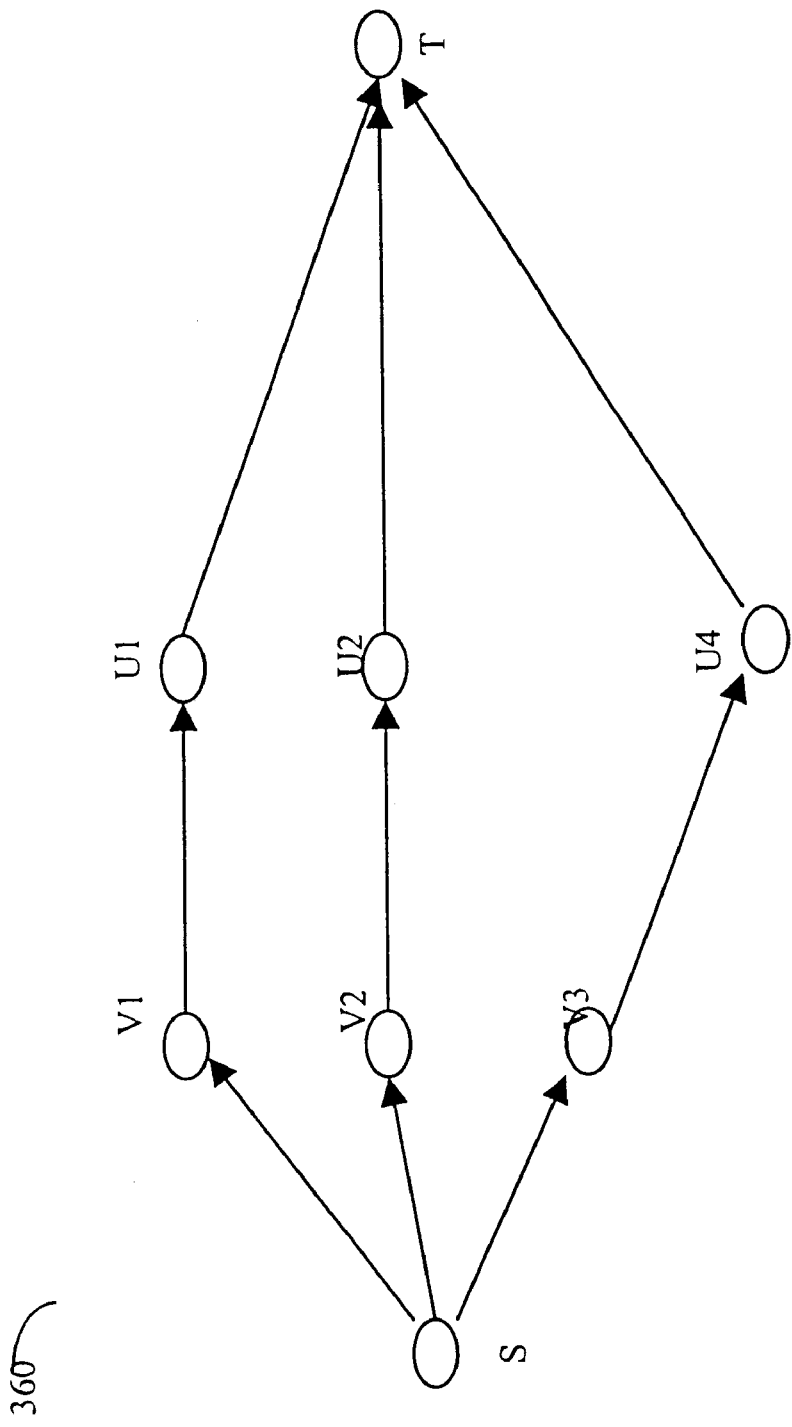

Execution of step 118f produces g of the first stage which is constructed as represented in FIG. 17. The flow g includes all the thick or bolded arrows in selecting a path from s to t for which flow was pushed through v1, v2 and v3.

Figure 18:
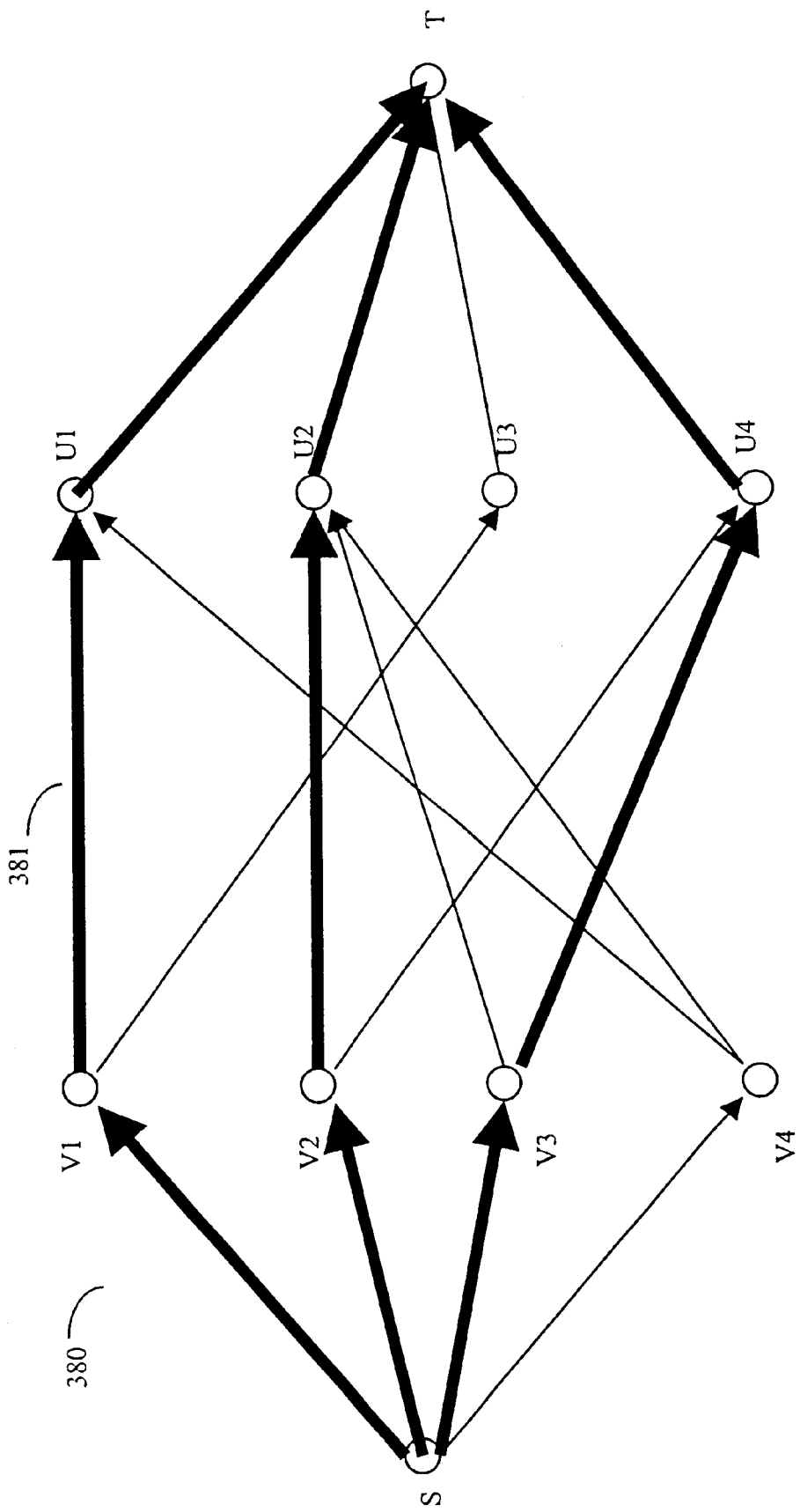
Figure 19:
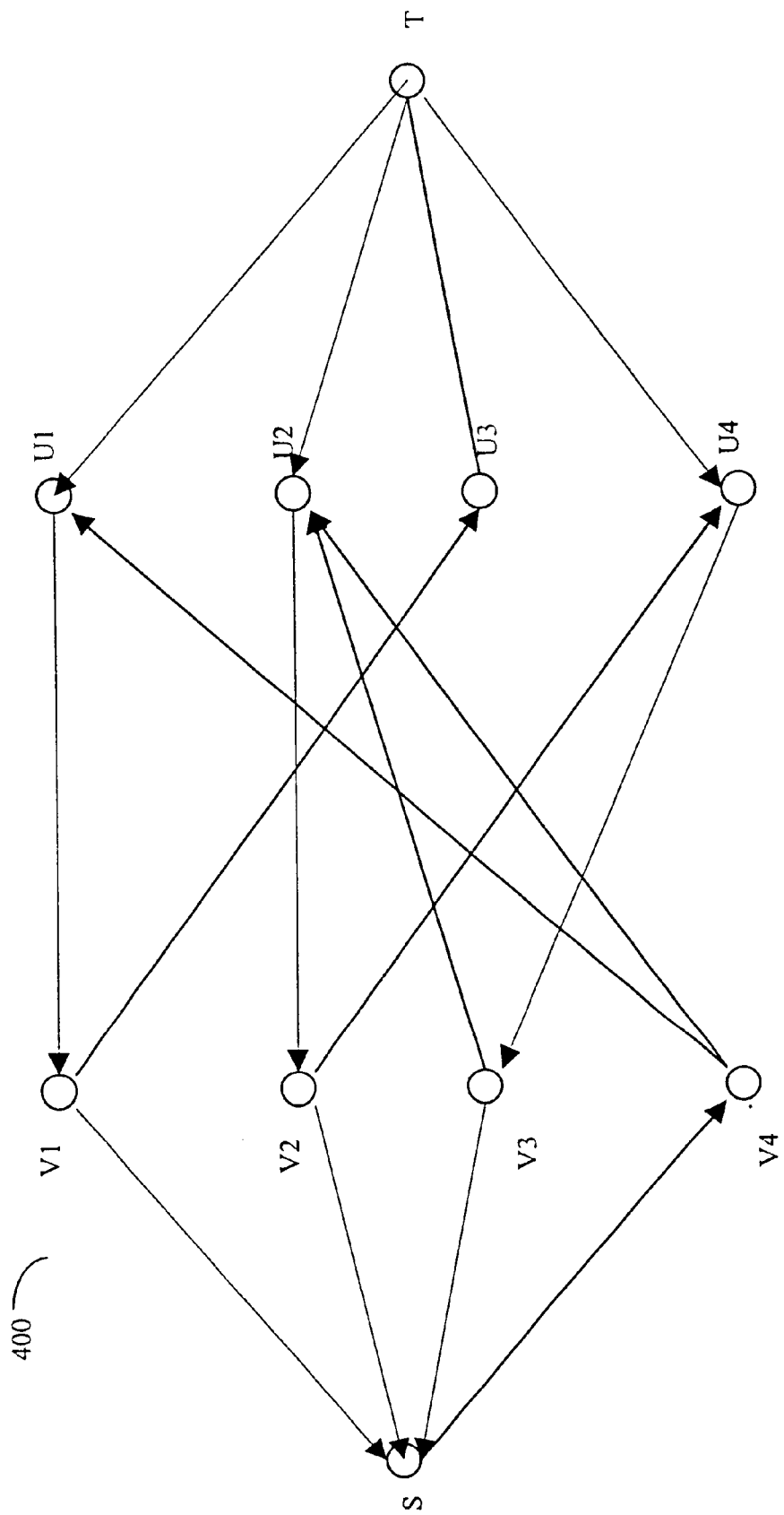
Figure 20:
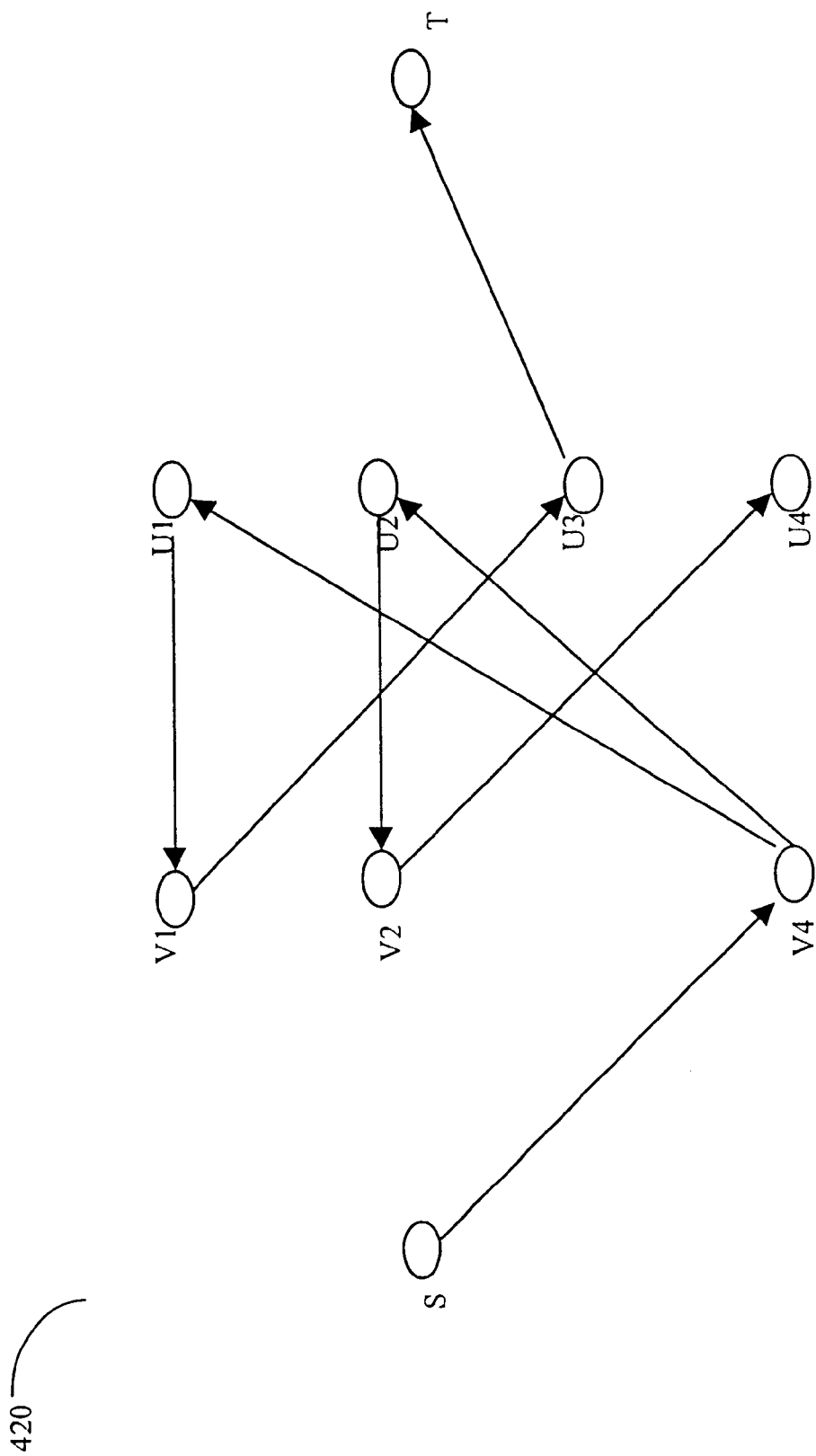

Stage 2 begins with f, N(f), and AN(f). f is shown in FIG. 18 with the bolded arrows indicating a capacity of 1, all others each 0. N(f) may be formed by reversing the arcs in the flow f to construct N(f), as shown in FIG. 19. Note that only the bolded arrows represent the flow f are the only arrows of FIG. 18 that are reversed, and AN(f) is shown in FIG. 20.

Figure 21:
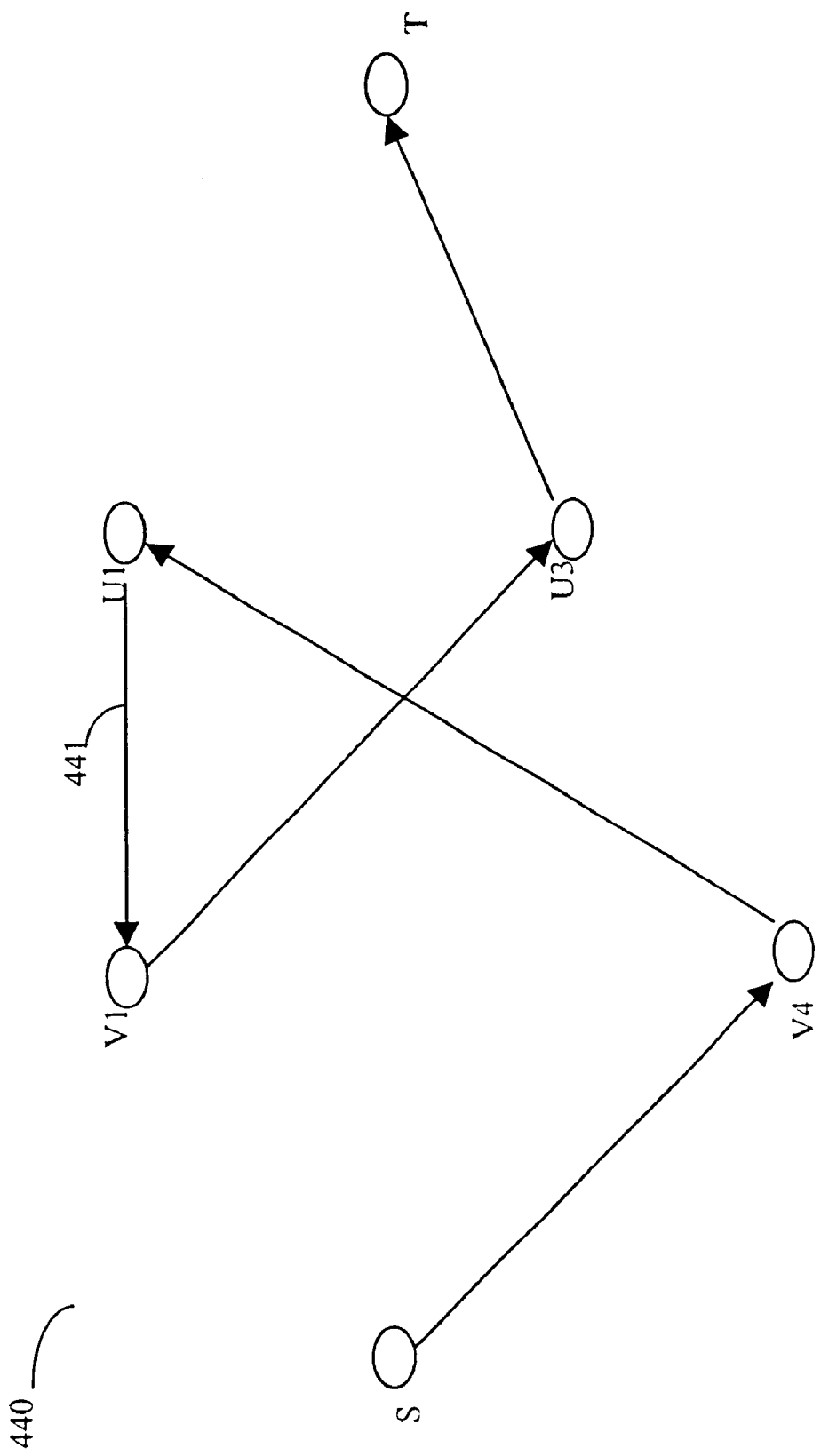

Now, AN(f) is "pruned" or trimmed by executing the "else" portion of 118b removing vertices other than s and t with throughput=0 resulting in AN(f) of FIG. 21.

A push and pull operation is performed through v4 using all arcs and vertices of FIG. 21. Subsequently, these vertices and arcs other than s and t are removed from AN(f) causing stage 2 to terminate with g being that of FIG. 21 using all arcs and vertices included therein. The flow f is constructed by adding g from stage 2 to the f from stage 1 resulting in the flow f of FIG. 22. It should be noted that in constructing the flow f of FIG. 22 from f and g, arrow or arc 441 of FIG. 21 and arc 381 of FIG. 18 cancel out each other resulting in no capacity for that arc. The bolded or thickened arrows of FIG. 22 are included in the flow f at the end of stage 2 after adding g.

Figure 22:
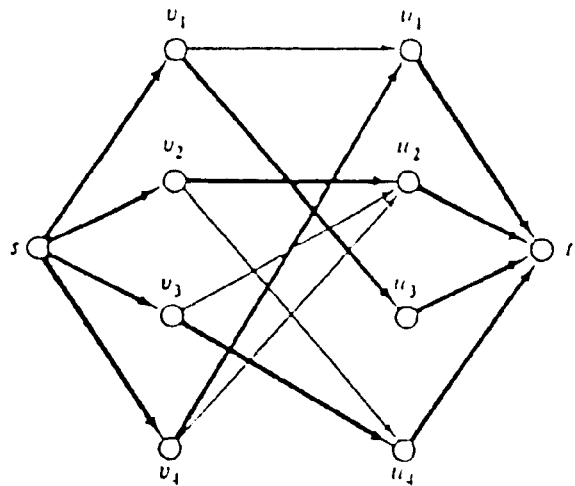

At the beginning of stage 3, the flow f is as also shown in FIG. 22. N(f) may be formed, as described elsewhere herein, in an embodiment by reversing the arcs. Statement 119 of FIG. 12 is executed since in the newly formed AN(f), there is no path from s to t. Thus, stage 3, and the representation of the method 114 of FIG. 12 is complete in this example.

Figure 23:
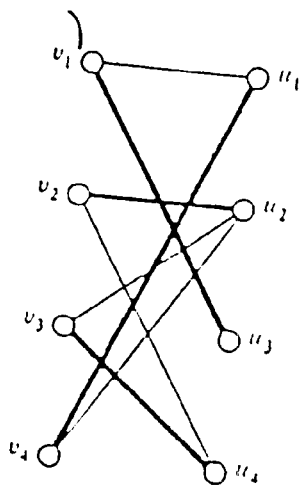

Now, the maximum flow has been found as represented in FIG. 22. From this, the maximum matching may be constructed as in FIG. 23. An embodiment may also include variations using the representation of FIG. 13 for obtaining the maximum flow. An embodiment may construct N(f) for stage N+1 directly from g of stage N, rather than first forming f=f+g for Stage N, and then subsequently forming N(f) of Stage N+1 from f.

It should be noted that the maximum flow technique, as described herein, solves the bipartite matching problem for a bipartite graph B=(V, U, E) in $O((|V|+|U|)^{1/2}*|E|)$ time rather than $O((Min|V|,|U|)*|E|)$ time as with the augmenting path technique described elsewhere herein.

It should also be noted that the maximum flow technique may have more overhead costs than those associated with implementing the augmenting path technique that may each vary in accordance with each embodiment. Thus, for graphs having generally low numbers of vertices to be matched, the total cost of implementing the maximum flow technique may actually be more than that associated with the augmenting path technique considering, for example, costs in terms of memory and processor usage such as in maintenance and initialization of data structures, and the like. However, as the number of vertices and/or edges increases, the maximum flow technique generally performs better than the augmenting path technique. The maximum flow technique may also be more difficult to implement in accordance with some embodiments than the augmenting path technique.

The foregoing description sets forth two general techniques that may be used in solving a bipartite graph matching problem although others are known to those skilled in the art as being solutions for solving this general class of problems. The foregoing describes techniques for representing an instance of the problem of determining a DRV for an LV as an instance of the bipartite graph matching problem. Thus, solutions to this type of problem may be used.

It should be noted that in an embodiment, for example, as shown in FIG. 1, a plurality of temporary storage locations of DRVs may be determined for each LV. This may be performed, for example, in an embodiment to store data of an LV and a "mirror" of the LV as part of backup or secondary copy of data. This secondary copy may be used in the event of system problems or errors such as may be included in a fault-tolerant plan implemented in a computer system using data storage systems, for example, such as the Symmetrix data storage system.

It should be noted that an embodiment may include any predetermined criteria for determining DRV candidates, for example, that are appropriate for a particular LV. An embodiment may also include no particular criteria as well.

It should also be noted that an embodiment may include the foregoing techniques as part of an optimization that may be included, for example, in an optimizer included in the computer system 10 of FIG. 1. The optimizer may reside in the service processor 22a of FIG. 2 as may be included, for example, in a data storage system such as the Symmetrix data storage system. A technique for matching of DRV candidate to each LV may also be included in software and/or hardware that resides and is executed in any one or more other processors in each of the data storage systems of FIG. 2. An embodiment may also implement all or a portion of the foregoing matching determination technique using hardware and/or software that resides and is executed on other processors in the computer system 10, such as the data manager system and/or host system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed in a computer system for matching at least one logical volume with a unique alternate storage location comprising:
   representing each of said at least one logical volume and each of at least one alternate storage location as a vertex in a graph;
   determining which of said at least one alternate storage location are candidates for each of said at least one logical volume and representing a relationship between said each logical volume and each of said at least one alternate storage location identified as a candidate for said each logical volume as an edge in said graph; and
   determining, from said candidates and using a bipartite graph matching technique for each of said at least one logical volume, a unique one of said at least one alternate storage location.

2. The method of claim 1, wherein said at least one logical volume is a plurality of logical volumes, and said at least one alternate storage location is a plurality of alternate storage locations.

3. The method of claim 2, further comprising:
   identifying at least one logical volume to be swapped; and
   forming said graph using said at least one logical volume to be swapped.

4. The method of claim 3, wherein said identifying at least one logical volume to be swapped is performed automatically as an optimization in said computer system.

5. The method of claim 4, wherein said plurality of alternate storage locations are temporary locations used in connection with swapping said at least one logical volume.

6. The method of claim 2, further comprising:
   determining an augmenting path P in said graph with respect to a matching M matching a logical volume with a unique one of said alternate storage locations; and
   updating said matching M to be M⊕P.

7. The method of claim 6, wherein said determining an augmenting path and said updating said matching M are performed for a plurality of stages.

8. The method of claim 2, further comprising:
   determining at least one candidate from said plurality of alternate storage locations for at least one of said plurality of logical volumes in accordance with predetermined criteria.

9. The method of claim 8, wherein said predetermined criteria includes at least one of: size of the logical volume, version of software included in a data storage entity including said logical volume, version of hardware included in said data storage entity.

10. The method of claim 9, further comprising:
    for each of said plurality of alternate storage locations, determining whether a data storage entity including said logical volume is the same data storage entity including an alternate storage location; and
    including said alternative storage location as a candidate for said logical volume if said data storage entity is not the same and said alternative storage location meets other predetermined criteria.

11. A method executed in a computer system for matching at least one logical volume with a unique alternate storage location comprising:
    representing each of said at least one logical volume and each of at least one alternate storage location as a vertex in a graph;
    determining which of said at least one alternate storage location are candidates for each of said at least one logical volume and representing a relationship between said each logical volume and each of said at least one alternate storage location as an edge in said graph;
    determining, using a bipartite graph matching technique for each of said at least one logical volume, a unique one of said at least one alternate storage location; and
    wherein said at least one logical volume is a plurality of logical volumes, and said at least one alternate storage location is a plurality of alternate storage locations; and
    the method further comprising:
    using a maximum flow technique for matching each of said plurality of logical volumes to a unique one of said plurality of alternate storage locations.

12. The method of claim 11, further comprising:
    determining a simple network representing said graph, said simple network having a common source s and a common sink t with arcs of capacity of one;
    determining a maximum flow in the simple network; and
    using said maximum flow to determine a maximum matching including for each of said plurality of logical volumes, a unique one of said plurality of alternate storage locations.

13. The method of claim 12, wherein said bipartite graph matching technique includes a plurality of stages, at the end of each of said plurality of stages a portion of the maximal flow of a network constructed from said graph is determined.

14. The method of claim 13, wherein said determining a maximum flow further comprises:
    determining a plurality of shortest paths from s to t.

15. A computer readable medium for storing computer executable code for matching at least one logical volume with a unique alternate storage location comprising:
    computer executable code for representing each of said at least one logical volume and each of at least one alternate storage location as a vertex in a graph;
    computer executable code for determining which of said at least one alternate storage location are candidates for each of said at least one logical volume and representing a relationship between said each logical volume and each of said at least one alternate storage locations identified as a candidate for said each logical volume as an edge in said graph; and
    computer executable code for determining, from said candidates and using a bipartite graph matching technique for each of said at least one logical volume, a unique one of said at least one alternate storage locations.

16. The computer readable medium of claim 15, wherein said at least one logical volume is a plurality of logical volumes, and said at least one alternate storage location is a plurality of alternate storage locations.

17. The computer readable medium of claim 16, further comprising:
    machine executable code for identifying at least one logical volume to be swapped; and
    machine executable code for forming said graph using said at least one logical volume to be swapped.

18. The computer readable medium of claim 17, wherein said machine executable code for identifying at least one logical volume to be swapped is executed automatically as an optimization in said computer system.

19. The computer readable medium of claim 18, wherein said plurality of alternate storage locations are temporary locations used in connection with swapping said at least one logical volume.

20. The computer readable medium of claim 16, further comprising:
   machine executable code for determining an augmenting path P in said graph with respect to a matching M matching a logical volume with a unique one of said alternate storage locations; and
   machine executable code for updating said matching M to be M⊕P.

21. The computer readable medium of claim 20, further comprising machine executable code for determining an augmenting path P in said graph with respect to a matching M matching a logical volume with a unique one of said alternate storage locations and for updating said matching M to be M⊕P for a plurality of stages.

22. The computer readable medium of claim 16, further comprising:
   machine executable code for determining at least one candidate from said plurality of alternate storage locations for at least one of said plurality of logical volumes in accordance with predetermined criteria.

23. The computer readable medium of claim 22, wherein said predetermined criteria includes at least one of: size of the logical volume, version of software included in a data storage entity including said logical volume, version of hardware included in said data storage entity.

24. The computer readable medium of claim 23, further comprising:
   machine executable code for determining, for each of said plurality of alternate storage locations, whether a data storage entity including said logical volume is the same data storage entity including an alternate storage location; and
   machine executable code for including said alternative storage location as a candidate for said logical volume if said data storage entity is not the same and said alternative storage location meets other predetermined criteria.

25. A computer readable medium for storing computer executable code for matching at least one logical volume with a unique alternate storage location comprising:
   computer executable code for representing each of said at least one logical volume and each of at least one alternate storage location as a vertex in a graph;
   computer executable code for determining which of said at least one alternate storage location are candidates for each of said at least one logical volume and representing a relationship between said each logical volume and each of said at least one alternate storage locations as an edge in said graph;
   computer executable code for determining, using a bipartite graph matching technique for each of said at least one logical volume, a unique one of said at least one alternate storage locations; and
   wherein said at least one logical volume is a plurality of logical volumes, and said at least one alternate storage location is a plurality of alternate storage locations; and
   the computer program product further comprising:
      computer executable code for executing a maximum flow technique for matching each of said plurality of logical volumes to a unique one of said plurality of storage locations.

26. The computer readable medium of claim 25, further comprising:
   machine executable code for determining a simple network representing said graph, said simple network having a common source s and a common sink t with arcs of capacity of one;
   machine executable code for determining a maximum flow in the simple network; and
   machine executable code using said maximum flow to determine a maximum matching including for each of said plurality of logical volumes, a unique one of said plurality of alternate storage locations.

27. The computer readable medium of claim 26, wherein said bipartite graph matching technique includes a plurality of stages, at the end of each of said plurality of stages a portion of the maximal flow of a network constructed from said graph is determined.

28. The computer readable medium of claim 27, wherein said machine executable code for determining a maximum flow further comprises:
   machine executable code for determining a plurality of shortest paths from s to t.

* * * * *